March 30, 1954

G. J. POIVILLIERS 2,673,490

DEVICE FOR RESTITUTION OF IMAGES

Filed Aug. 16, 1949

INVENTOR
Georges Jean Poivilliers.

BY Cameron, Kerkam † Sutton

ATTORNEYS

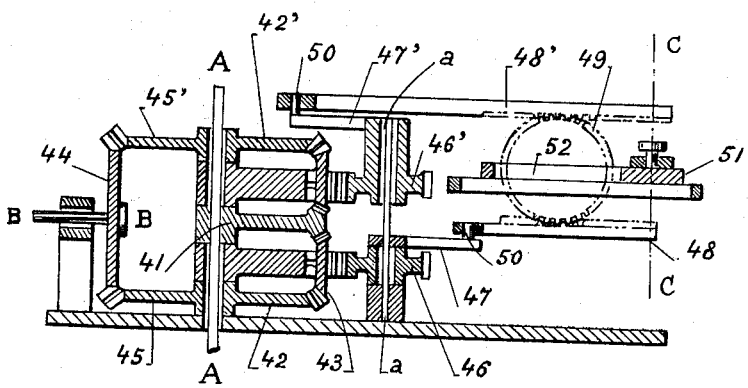

Patented Mar. 30, 1954

2,673,490

UNITED STATES PATENT OFFICE 2,673,490

DEVICE FOR RESTITUTION OF IMAGES

Georges Jean Poivilliers, Neuilly-sur-Seine, France

Application August 16, 1949, Serial No. 110,652

Claims priority, application France August 26, 1948

5 Claims. (Cl. 88—29)

The present invention relates to improvements in all restitutional devices which are based on the materialization in space of pairs of homologous perspective rays. This invention concerns especially restitutional devices which are based on the observation of negatives through lenses which are identical to the picture-taking lenses (the Porro-Koppe method) and in which the pairs of homologous perspective rays are materialised by their projections on two perpendicular planes in accordance with the principles of descriptive geometry.

It is known that in restitutional devices utilizing the above method (Porro-Koppe) two problems are encountered in connection with obtaining a correct stereoscopic fusion, especially when the photographs in question have been taken with wide angle lenses.

One of these problems is the difference in the apparent diameter of the images under observation, this apparent diameter varying for each of the images in inverse ratio to the distance from the point under observation to the corresponding point of sight.

The other problem is the variation in the orientation of the images in the field of the eye-pieces with inclination of the line of sight.

In order to bring about a stereoscopic fusion of the two observed images, the following is required:

(1) their apparent vertical diameters must be substantially the same; and (2) the images of the homologous elements of the photographed object, situated in a plane passing through the two points of sight, must be aligned parallel to the straight line connecting the centers of the eye-pieces.

These conditions are not automatically realized in the known devices.

The present invention aims, first of all, to remedy these inconveniences.

To this end, the invention pertains to a device suitable for restitution apparatus originating from pairs of stereoscopic photographs in which pairs of homologous perspective rays are materialised in space, said method being characterised by the fact that the enlarging capacity of a pancratic device of each of the sighting telescopes varies automatically as a function of the azimuthal direction only of the line of sight, the law of variation being such that the equality of the apparent diameters of each of the stereoscopic images must be automatically realized with absolute perfection for a given plane of sight which forms, together with the azimuthal reference plane of the restitution, an angle close to the mean of the possible inclinations of the different planes. This approximate correction makes it possible to insure with the best conditions stereoscopic fusion by practically eliminating the inequalities in apparent diameter of the pairs of stereoscopic images, which inequalities are due to the fact that the apparent diameters vary in inverse ratio to the distance from the point under observation to the corresponding point of sight.

This invention also concerns a device suitable for restitution apparatus originating from pairs of stereoscopic photographs, characterised by the fact that the orientation of each of the images in the field of the eye-pieces of the sighting telescope is automatically corrected as a function of the inclination of the lines of sight, in accordance with the trigonometric relation $\sin C = \sin a \sin i'$, in which formula $C$ represents the angle of the introduced correction while $a$ and $i'$ represent, respectively, the angles of inclination of the two projections of the line of sight, first, on the reference plane of the azimuths passing through the line joining the two points of sight $S_1$ and $S_2$, and, second, on the reference plane of the elevations perpendicular to said line joining the two points of sight, in such a manner that the images of the homologous elements of the object photographed situated in a plane passing through the two points of sight $S_1$, $S_2$ are aligned parallel to the straight line connecting the centers of the eye-pieces, which makes it possible to insure a correct stereoscopic fusion.

The invention also covers the features described below as well as their various possible combinations.

Restitutional devices conforming to this invention are represented, as examples, in the accompanying drawings, wherein:

Figs. 3 and 4 represent schematically two practical forms of mechanism for automatic correction of the orientation of each of the stereoscopic images in the field of the eye-pieces.

Figure 2:
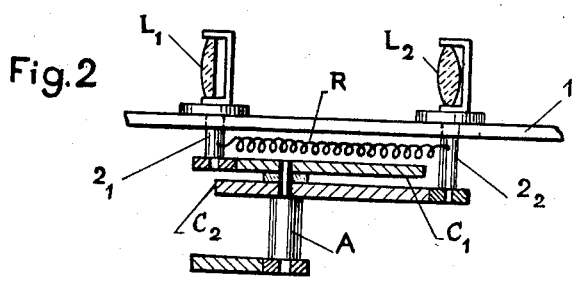
Fig. 2 is a schematic vertical sectional view of the means for automatically equalizing the apparent diameters of the homologous points.

The device illustrated in Fig. 2 aims at obtaining an automatic equalization of the apparent diameters of homologous images situated in planes normal to the planes of observation.

Figure 1:
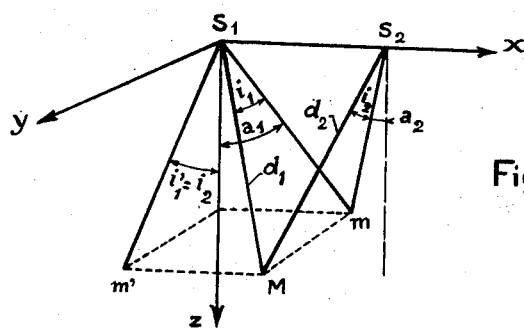
Fig. 1 is a schematic representation of the restitutional reference trihedron of which the apex consists of one of the points of sight $S_1$ and one of the edges is formed by the line joining the two points of sight $S_1$ and $S_2$.

Considering for this purpose Fig. 1, in which M represents a point of the restored image, and $S_1$ and $S_2$ represent the two points of sight, the two restitutional reference planes are, first, the azimuthal plane $S_1xz$ which passes through the line adjoining the two points of sight $S_1$ and $S_2$, and, second, the elevation plane $S_1zy$ which is normal to the line $S_1 S_2$ and passes through one of the two points of sight, for example, $S_1$.

Let $d_1$ and $d_2$ designate the distances between the point M and the two points of sight $S_1$, $S_2$ and let $f_1$ and $f_2$ designate the focal lengths of the two corresponding branches of the sighting telescope. In order to observe the two images under the same apparent diameter through eyepieces of the same focal length, it is necessary that the following relationship should exist between $f_1$, $f_2$, $d_1$ and $d_2$:

$$f_1/d_1 = f_2/d_2$$

Let $i_1$ and $i_2$ designate the angles formed by the lines of sight $MS_1$ and $MS_2$ with the azimuthal reference plane $S_1xz$; let $a_1$ and $a_2$ designate the angles formed by the projections of these lines of sight on the azimuthal plane with the perpendicular to the baseline situated in said plane. The equality of the projections of $MS_1$ and $MS_2$ on this normal $S_1z$ produces the following relation:

$$d_1 \cos a_1 \cos i_1 = d_2 \cos a_2 \cos i_2$$

or $$\frac{d_1 \cos a_1}{\sqrt{1 + \operatorname{tg}^2 i_2}} = \frac{d_2 \cos a_2}{\sqrt{1 + \operatorname{tg}^2 i_2}}$$

Suppose that $i'_1$ and $i'_2$ are the angles formed by the projections of $MS_1$ and $MS_2$ on the plane of the heights with the normal $S_1z$ mentioned above.

Let us indicate by $i'$ their common value.

$$i' = i'_1 = i'_2$$

The following relations are then had:

$$\operatorname{tg} i_1 = \operatorname{tg} i'_1 \cos a_1 = \operatorname{tg} i' \cos a_1$$
$$\operatorname{tg} i_2 = \operatorname{tg} i'_2 \cos a_2 = \operatorname{tg} i' \cos a_2$$

Consequently:

$$\frac{d_1 \cos a_1}{\sqrt{1 + \operatorname{tg}^2 i' \cos^2 a_1}} = \frac{d_2 \cos a_2}{\sqrt{1 + \operatorname{tg}^2 i' \cos^2 a_2}}$$

In accordance with the foregoing $f_1/d_1 = f_2/d_2$, $f_1$ and $f_2$ must satisfy the relation:

$$\frac{f_1 \cos a_1}{\sqrt{1 + \operatorname{tg}^2 i' \cos^2 a_1}} = \frac{f_2 \cos a_2}{\sqrt{1 + \operatorname{tg}^2 i' \cos^2 a_2}}$$

Introduction of a variation of focal length as a function of the two variables $a$ and $i'$ would in itself complicate matters; but if the angle $i'$ remains substantially between $+45°$ and $-45°$, it is possible to employ for the formula an intermediate value such that the relation of the apparent diameters normal to the plane of sight differs little from unity.

Assuming, for example, the value 0.5 for $\operatorname{tg} i'$, the relation between the focal lengths of the two branches of the telescope becomes:

$$\frac{f_1 \cos a^1}{\sqrt{1 + 0.25 \cos^2 a_1}} = \frac{f_2 \cos a_2}{\sqrt{1 + 0.25 \cos^2 a_2}}$$

The above relation depends only on the azimuth angles $a$, and in the most unfavorable case where the distance to the base of the projection of the point under observation on the reference plane of the azimuths is equal to the latter, the relation of the apparent diameters varies only from 0.95 to 1.09 instead of remaining equal to unity, as stated, for inclinations of the plane of observation ranging from 0° to ±45°.

The focal lengths $f_1$ and $f_2$ vary then from 0.9 f to 0.6 f while the angles $a_1$ and $a_2$ vary from 0° to 45°.

Fig. 2 represents, in accordance with the invention, a device intended to obtain automatically the relation:

$$\frac{f_1 \cos a_1}{\sqrt{1 + 0.25 \cos^2 a_1}} = \frac{f_2 \cos a_2}{\sqrt{1 + 0.25 \cos^2 a_2}}$$

To this end, each of the branches of the telescope comprises a pancratic device, that is, a device in which the displacements of two lenses, movable in position along their axis, are controlled by cams in such a manner that the focal length of this combination varies while the focal plane remains fixed.

This group of lenses $L_1$ and $L_2$ (Fig. 2) is mounted on a rectilinear guide-rail parallel to their axis. Two cams $C_1$ and $C_2$ are fixed to the same mechanical axis A, each cam moving one of the lenses by acting on a pin $2_1$, or $2_2$ integral with the respective lens support. These pins are both pulled into contact with the cams $C_1$, $C_2$ by a spring R.

The rotation of the mechanical axis A is proportional, in a certain ratio of multiplication, to the rotation of the corresponding azimuthal measuring rod. The connection is effected, for example, by means of an articulated parallelogram and a system of pinions not shown herein.

The two cams $C_1$, $C_2$ are calculated for points as a function of the focal distance corresponding to their angle of rotation from the original position $a = 0$, in accordance with known principles of optical calculations involving pancratic systems.

Figure 3:
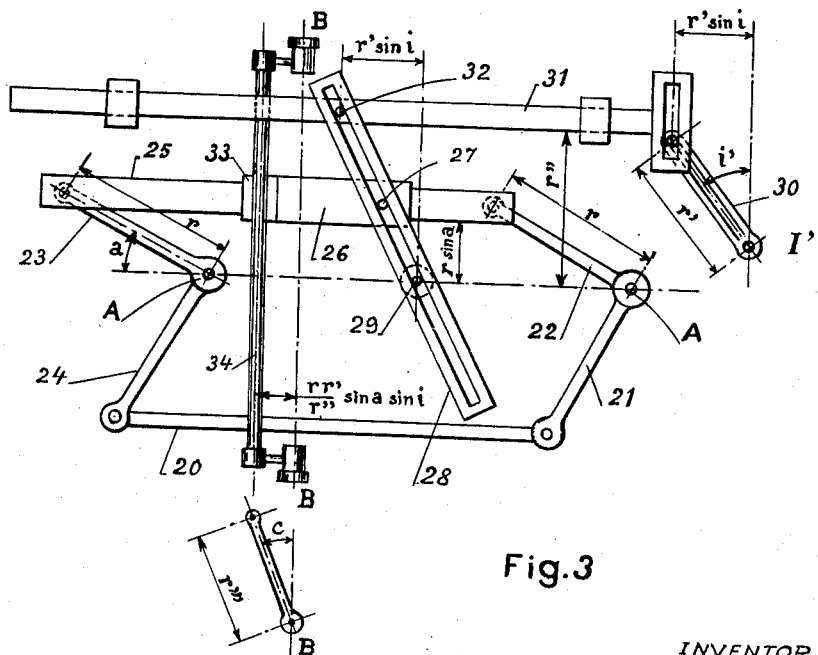

Figs. 3 and 4 represent devices for automatically correcting the orientation of each of the stereoscopic images in the field of the eye-pieces.

It is already known that the rotation of images in the field of the eye-pieces may be accomplished by rotation of a Dove or Amici prism moved by the planet gear of a differential gearing. One of the gears of such a differential is rotated according to the tilting angle of the telescope, which preserves the orientation, in the field of the corresponding eye-piece, of images of the points situated in the plane $S_1 Mm$ (Fig. 1).

Trigonometric considerations show (Fig. 1) that the image of the outline of the plane of observation $S_1 Mm$ in the field of the eye-piece forms with the perpendicular to the plane $S_1 Mm$ the angle C, which bears the following relation to the angles $a$ and $i'$: $\sin C = \sin a \sin i'$.

In accordance with the invention, the devices illustrated in Figs. 3 and 4 aim at achieving this relation in such a manner as to insure an automatic correction of the orientation of each of the stereoscopic images in the field of the eye-piece.

The first embodiment, illustrated in Fig. 3, uses for this purpose a system of levers constituted in the following way:

A double elbow parallelogram 20, 21, 22, 23, 24 and 25, which moves about the fixed pivots A, A, is connected with the corresponding azimuth measuring rod and participates in its angular movement $a$, through an appropriate connection not shown herein (parallelogram, gears, flexible connection, etc.).

One of the parallelogram rods 25 carries a slide

26. The slide 26 carries a pin 27 articulated with a measuring rod 28 which is movable about an axis 29 aligned with the axis AA. The adjustment of the parallelogram 20 . . . 25 about the azimuth connection is such that the origin of the rotational angles $a$ of the cranks of the rod 25 is the line between the pivots AA. The length of these cranks is $r$.

A crank 30 of length $r'$ participates in the movement of the elevation measuring rod by means of an appropriate connection not shown herein, this movement corresponding to the materialization $S_1m'$ (Fig. 1) of the restitutional device. This crank 30 turns through the angle $i'$. Its adjustment is such that the origin of the angles $i'$ is perpendicular to the direction AA.

The crank 30 moves a sliding bar 31 parallel to AA, to the extent $r' \sin i'$. A pin 32 carried by the sliding bar 31 controls the pivoting of the measuring rod 28. Its position is such that for $i'=0$, the rod 28 is perpendicular to the direction AA.

The distance between the pin 32 and the axis AA is $r''$.

The carriage 26 is displaced in such a manner that, starting from the original position of the rod 28, it moves by a quantity equal to $$\frac{rr'}{r''} \sin a \sin i'$$

The carriage 26 draws along, in its movement through a socket 33, a cylindrical rod 34 parallel to the plane of movement of the arm 25 and perpendicularly to AA. This rod 34 pivots about an axis BB which is parallel thereto, its distance from said axis being $r'''$. At the original position $i'=0$, the axis of the rod 34 is in the plane projecting the axis BB on the plane of Fig. 3.

Under these conditions, the angle $C$ of rotation of the rod 34 about the axis BB bears the following relation to the angles $a$ and $i'$:

$$r''' \sin C = \frac{rr'}{r''} \sin a \sin i'$$

In order to meet the trigonometric relation, it suffices that the lengths $r, r', r''$ and $r'''$ be such that $$rr' = r''r'''$$

The angle $C$ thus obtained is transmitted to the free gear of the differential controlling the Dove or Amici prism by any appropriate angle transmission device, for example, by means of an articulated parallelogram.

In a second form of device for correcting image rotation, the formula is replaced by the equivalent relation:

$$\sin C = \tfrac{1}{2}[\cos (a-i') - \cos (a+i')]$$

a practical application of which is represented by the showing of Fig. 4.

A shaft AA is driven by means of an appropriate connection through rotation of the azimuthal measuring rod $Sm$ (Fig. 1). On this shaft AA is keyed a double conical sector 41 which participates in its rotational movement through the angle $a$.

On this shaft AA are freely mounted two other conical sectors 42 and 42' of the same radius as the preceding sector, and between these and the sector 41 are two planetary gears 43 and 43', each of which engages the sector 41 and one of the sectors 42, 42'.

A pinion 44, movable about the axis BB which is perpendicular to the axis AA, is connected with the elevation measuring rod of the restitutional device materializing the direction $S_1m'$ by means of an appropriate connection not shown herein. This pinion 44 turns through the angle $i'$. It meshes with two other pinions 45, 45' of the same radius which are integral with the free portions 42 and 42' of the two differentials. Thus it follows that one of the planetary gears 43, 43' of the differential turns through the angle $\tfrac{1}{2}(a+i')$ while the other turns through the angle $\tfrac{1}{2}(a-i')$.

Two straight pinions 46, 46' mounted loosely on a shaft $aa$ which is parallel to the shaft AA, mesh with a toothed sector which is supported by each of the planetary gears 43 and 43' and the radius of which is double that of the pinions 46 and 46'. Thus it follows that these pinions 46 and 46' turn, respectively, through the angles $(a+i')$ and $(a-i')$.

Two cranks 47 and 47', of length $r$, integral with these pinions and carrying pins 50 and 50' which engage slots in two parallel racks 48 and 48', move said racks, respectively, the distances $r \cos (a+i')$ and $r \cos (a-i')$.

The two racks 48 and 48' mesh with the same intermediate pinion 49 which is mounted on a sliding carriage 51. The movement of the carriage 51 parallel to the racks 48 and 48' is equal to $\tfrac{1}{2}r[\cos (a-i') - \cos (a+i')]$.

The sliding carriage 51 brings about, by means of a rectilinear slot 52, rotation of a crank of length $r$, not shown herein, which pivots around an axis CC. The rotation $C$ of this crank is transmitted to the differential which controls rotation of the Dove or Amici prism by an appropriate device, not shown.

The rotation of $C$ of the Dove or Amici prism is then given, as previously indicated, by the following formula:

$$\sin C = \tfrac{1}{2}[\cos (a-i') - \cos (a+i')]$$

which formula is equivalent to $\sin C = \sin a \sin i'$.

What is claimed is:

1. In apparatus for the restitution of images from pairs of stereoscopic photographs, a binocular sighting telescope including a pair of pancratic devices, and means for controlling the enlarging capacity of said devices including angularly movable cam means the angular position of which being controlled in function of the azimuthal direction of the line of sight and the law of variation of the enlarging capacity being in accordance with the formula $$\frac{f_1 \cos a_1}{\sqrt{1+0.25 \cos^2 a_1}} = \frac{f_2 \cos a_2}{\sqrt{1+0.25 \cos^2 a_2}}$$

wherein $f_1$ and $f_2$ represent the focal lengths of the two branches of the sighting telescope, and $a_1$ and $a_2$ represent the angles formed by the projections of the lines of sight on the azimuthal plane with the normals to the line joining the points of sight $S_1$ and $S_2$ situated in said plane.

2. In apparatus for the restitution of images from pairs of stereoscopic photographs by means of a binocular viewing telescope, means for automatically correcting the orientation of each of the images in the field of the telescope eye-pieces including a Dove or Amici prism, a differential mechanism for effecting complementary rotation of said prism, means for controlling the operation of said differential mechanism including rods adjustable about parallel axes through the angles $a$ and $i'$ materialising the projections of the lines of sight on the reference plane of the azimuths and on the reference plane of the elevations, respectively, the complementary rotation of said prism being governed by the formula $\sin C = \sin a \sin i'$, wherein C represents the angle of said complementary rotation while $a$ and $i'$ represent, respectively, the angles of inclination of the two projections of the line of sight, first, on the reference plane of the azimuths, and, second, on the reference plane of the elevations.

3. Restitutional apparatus according to claim 2 wherein said automatic orientation correcting means includes a first lever system embodying a plurality of levers rotatable simultaneously about a pair of fixed pivotal axes through the angle $a$, the angle $a$ being measured from the line joining said axes, a second lever system rotatable about another fixed pivotal axis through the angle $i'$, the angle $i'$ being measured from a line perpendicular to the line joining the pivotal axes of said first lever system, a carriage so connected to both of said lever systems as to be moved thereby in a direction parallel to the line joining the pivotal axes of said first lever system in an amount proportional to $\sin a \sin i'$, and means including a bar connected to said carriage and rotatable about an axis at right angles to the line joining said pivotal axes of the first lever system for actuating the differential mechanism effecting rotation of the Dove or Amici prism.

4. Restitution apparatus according to claim 2 wherein the automatic orientation correcting means graphically represents the formula $$\sin C = \tfrac{1}{2}[\cos(a-i') - \cos(a+i')]$$

and includes a first system of gears rotatable about a first axis through the angle $a$, a second system of gears rotatable about a second axis perpendicular to said first axis through the angle $i'$, a differential gear so connected to said first and second gear systems that one of the planetary gears of the differential is rotated through the angle $\tfrac{1}{2}(a+i')$ while the other planetary gear is rotated through the angle $\tfrac{1}{2}(a-i')$, and means for combining the movements of said planetary gears including an element rotatable about a third axis and having a resultant movement proportional to $\tfrac{1}{2}[\cos(a-i') - \cos(a+i')]$, said element having an operative connection with the differential mechanism effecting rotation of the Dove or Amici prism.

5. In apparatus for the restitution of images from pairs of stereoscopic photographs by means of a binocular viewing telescope including a pair of pancratic devices, means for controlling the enlarging capacity of said devices including angularly movable cam means the angular position of which is controlled in function of the azimuthal direction of the line of sight and the law of variation of the enlarging capacity being in accordance with the formula $$\frac{f_1 \cos a_1}{\sqrt{1+0.25 \cos^2 a_1}} = \frac{f_2 \cos a_2}{\sqrt{1+0.25 \cos^2 a_2}}$$

wherein $f_1$ and $f_2$ represent the focal lengths of the two branches of the sighting telescope, and $a_1$ and $a_2$ represent the angles formed by the projections of the lines of sight on the azimuthal plane with the normals to the line joining the points of sight $S_1$ and $S_2$ situated in said plane and means for automatically correcting the orientation of each of the images in the field of the telescope eye-pieces including a Dove or Amici prism, a differential mechanism for effecting complementary rotation of said prism, means for controlling the operation of said differential mechanism adjustable about parallel axes through the angles $a$ and $i'$ materialising the projections of the lines of sight on the reference plane of the azimuths and on the reference plane of the elevation, respectively, the complementary rotation of said prism being governed by the formula $\sin C = \sin a \sin i'$, wherein C represents the angle of said complementary rotation while $a$ and $i'$ represent, respectively, the angles of inclination of the two projections of the line of sight, first, on the reference plane of the azimuths and, second, on the reference plane of the elevations.

GEORGES JEAN POIVILLIERS.

References Cited in the file of this patent

UNITED STATES PATENTS

| Number | Name | Date |
|---|---|---|
| 879,572 | Neumayer | Feb. 18, 1908 |
| 1,168,650 | Kollmorgen | Jan. 18, 1916 |
| 1,467,163 | Hugershoff | Sept. 4, 1923 |
| 1,553,211 | Barr et al. | Sept. 8, 1925 |
| 1,843,439 | Bauersfeld et al. | Feb. 2, 1932 |
| 1,925,207 | Santoni | Sept. 5, 1933 |
| 2,057,921 | Santoni | Oct. 20, 1936 |
| 2,113,970 | Wild | Apr. 12, 1938 |
| 2,416,697 | Kaiser et al. | Mar. 4, 1947 |
| 2,444,815 | Edison | July 6, 1948 |
| 2,536,718 | Brandon | Jan. 2, 1951 |

FOREIGN PATENTS

| Number | Country | Date |
|---|---|---|
| 431,003 | Germany | June 26, 1926 |
| 463,879 | Great Britain | Aug. 8, 1937 |